Figure 1:
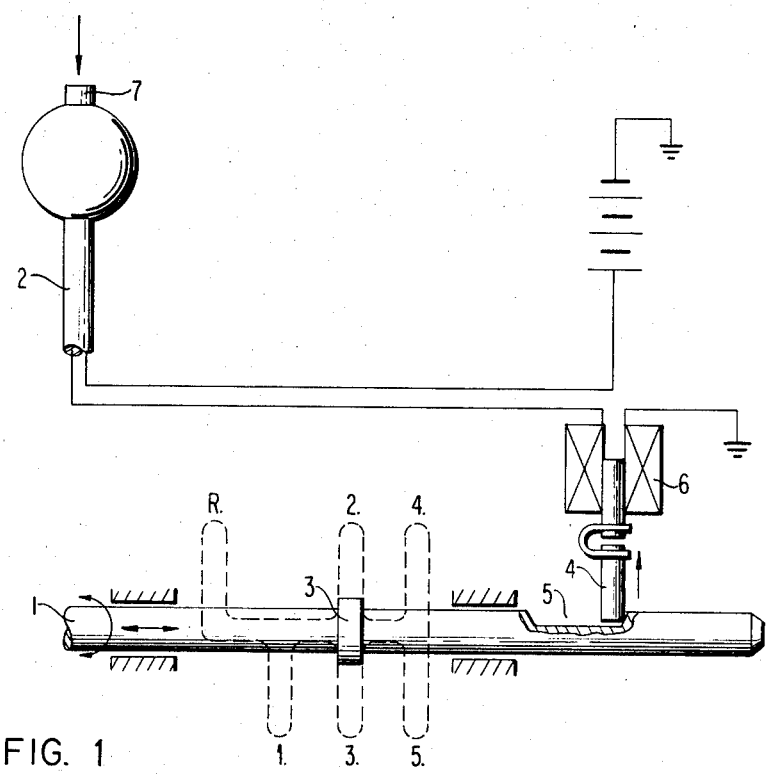

United States Patent
Naumann

[15] 3,690,193
[45] Sept. 12, 1972

[54] FIVE-SPEED GEAR-TYPE CHANGE SPEED TRANSMISSION

[72] Inventor: Fritz A. Naumann, Unterensingen, Germany

[73] Assignee: Daimler-Benz Aktiengesellschaft, Stuttgart-Unterturkheim, Germany

[22] Filed: Sept. 10, 1970

[21] Appl. No.: 70,991

[30] Foreign Application Priority Data
Sept. 12, 1969 Germany..........P 19 46 219.2

[52] U.S. Cl. .................................................74/473 R
[51] Int. Cl. ................................................G05g 9/12
[58] Field of Search.................74/476, 475, 477, 473

[56] References Cited
UNITED STATES PATENTS
3,533,301   10/1970   Hausinger....................74/475

Primary Examiner—Milton Kaufman
Attorney—Craig, Antonelli, Stewart & Hill

[57] ABSTRACT

A five-speed change-speed transmission, especially for sports-type vehicles, in which the shifting channels for fourth and fifth speed are disposed in one plane of rotation of the shifting shaft, the shifting channels for the second and third speeds are disposed in a second plane of rotation of the shifting shaft, the shifting channel for the first speed is disposed in a third plane of rotation adjacent to the second plane of rotation and the shifting channel for a reverse speed is disposed in a fourth plane of rotation of the shifting shaft, offset to the third plane of rotation in the axial direction of the shifting shaft; during a shifting down operation, the shifting shaft is normally prevented from reaching the third or fourth plane of rotation by a locking device which can be rendered ineffectual by operation of a push-button or the like at the shifting lever.

10 Claims, 2 Drawing Figures

PATENTED SEP 12 1972

3,690,193

INVENTOR:

FRITZ A. NAUMANN

BY Craig, Antonelli, Stewart & Hill

ATTORNEYS

FIVE-SPEED GEAR-TYPE CHANGE SPEED TRANSMISSION

The present invention relates to a five-speed change-speed gear particularly for sports-type vehicles, in which a shifting shaft equipped with a shifting finger or the like is adapted to be displaced longitudinally by means of a transmission shifting lever for the selection of the individual shifting channels and in which the shifting channels for the second and third speed as well as the shifting channels for the fourth and fifth speed are arranged in a respective plane of rotation of the shifting shaft whereas the shifting channels of the first speed and of the reverse speed are arranged each in a respective plane of rotation disposed offset to one another and adjacent the shifting channels for the second and third speeds.

With a sports-type vehicle and with a corresponding fast shifting of the transmission speeds it has been found in practice that with a transmission of the aforementioned type, during shifting back from fourth to third speed one reaches the shifting channel leading to the first speed or arrives in front of the shifting channel for the reverse speed. It is the aim of the present invention to eliminate this drawback which may have disadvantageous consequences, for example, in racing.

The underlying problems are solved according to the present invention in that a blocking mechanism automatically becoming operable and adapted to be released at will is provided, which blocks during a shifting down of the transmission a longitudinal displacement of the shifting shaft in such a manner that the shifting finger connected therewith can reach the shifting channel leading to the first speed or arrives in front of the shifting channel for the reverse speed.

A shifting down of the transmission is facilitated by the present invention and erroneous shifting operations are avoided. Since the first speed is used only for starting and also the reverse speed is engaged only during the standstill of the vehicle, it is of no importance that a locking mechanism has to be actuated for that purpose.

In an advantageous construction of the present invention the locking mechanism may consist of a locking pin engaging by spring force or by gravity, in a longitudinal groove or similar recess provided in the shifting shaft, which locking pin can be retracted from its locking position by means of an electromagnet that is adapted to be actuated by an electrical contact arranged at the transmission shifting lever.

Accordingly, it is an object of the present invention to provide a five-speed change-speed transmission, especially for sports-type motor vehicles which avoids by simple means the aforementioned shortcomings and drawbacks encountered in the prior art.

Another object of the present invention resides in a five-speed transmission of the type described above which facilitates the shifting operation and prevents erroneous shifting operations, especially when shifting down from fourth to third speed.

A further object of the present invention resides in a five-speed change-speed transmission of the type described above which eliminates by simple constructional means the danger of shifting into first or reverse speed during an intended shifting down from fourth to third speed.

These and further objects, features and advantages of the present invention will become more obvious from the following description when taken in connection with the accompanying drawing which shows, for purposes of illustration only, one embodiment in accordance with the present invention, and wherein FIG. 1 is a schematic view of a shifting arrangement for a five-speed gear in accordance with the present invention.

Figure 1A:
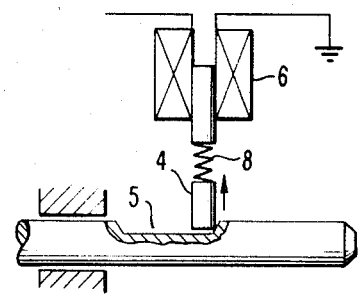

FIG. 1A is a schematic view of a portion of FIG. 1 which illustrates a spring biased locking pin arrangement.

Referring now to the drawing, a shifting shaft 1 is provided in a five-speed change-speed gear of a sports-type vehicle, which is displaced in its longitudinal direction, i.e., in its axial direction by means of a shifting lever 2 and possibly by adjoining intermediate members, and which can be rotated in its circumferential direction so that the five forward speeds and the reverse speed can be engaged by means of a shifting finger 3 rigid at the shifting shaft 1 according to the shifting diagram indicated in dash lines.

The shifting channels for the second and third speed are disposed in one plane of rotation of the shifting shaft 1. The shifting channels for the fourth and fifth speed are disposed adjacent thereto in another plane of rotation. The shifting channel for the first speed is disposed adjacent the shifting channel for the third speed whereas the shifting channel for the reverse speed is disposed, offset to that of the first speed, adjacent the shifting channel for the second speed.

During a speedy shifting-back of the transmission speeds, and more particularly from fourth to third speed, it happens frequently that the shifting shaft 1 is displaced too far so that the shifting finger 3 reaches the shifting channel for the first speed or might even stop in front of the shifting channel for the reverse speed. Such faulty shifting operations are prevented according to the present invention by a locking pin 4 which engages under the effect of a spring 8 of conventional type in a longitudinal groove 5 provided in the shifting shaft 1 and prevents by an abutment at one end of the longitudinal groove 5 that the shifting shaft 1 can be displaced out of the plane of rotation of the shifting channels for the engagement of the second and third speed in the direction toward the shifting channels for the first speed and the reverse speed. Alternatively, the spring 8 may be deleted such that the pin 4 engages the groove 5 by gravity force alone. The length of the longitudinal groove 5 corresponds to the distance of the shifting channels for the second and third speed and of the shifting channels for the fourth and fifth speed.

The engagement of the locking pin 4 in the longitudinal groove 5 of the shifting shaft 1 is released, i.e., rendered ineffectual during an intended shifting down from the second speed to the first speed by an electromagnet 6 which is rendered operable, i.e., energized, by way of a push-button 7 at the transmission lever 2 and a switch (not shown) connected therewith. The push-button 7 is actuated in the same manner when the reverse speed is intended to be engaged.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A multi-speed transmission in which a shifting shaft is longitudinally displaceable by means of a transmission shifting lever for the preselection of the individual shifting channels, and in which the shifting channels for the second and third speed are disposed in one plane of rotation of the shifting shaft whereas the shifting channels for the first speed and for the reverse speed are disposed in at least one plane of rotation disposed offset to the shifting channels for the second and third speed, characterized by a locking means operable to block a longitudinal displacement of the shifting shaft during a shifting down of the gear in such a manner that reaching of the shifting channel for the first speed or for the reverse speed is effectively prevented thereby and by override means for selectively rendering said locking means inoperative to block said longitudinal displacement.

2. A transmission according to claim 1, characterized in that the locking means is operable to become effective automatically.

3. A transmission according to claim 1, characterized in that the shifting shaft is provided with a shifting finger and in that said locking means normally prevents the shifting finger from reaching the shifting channel for the first speed or the shifting channel for the reverse speed during a shifting down operation.

4. A multi-speed transmission in which a shifting shaft is longitudinally displaceable by means of a transmission shifting lever for the preselection of the individual shifting channels, and in which the shifting channels for the second and third speed are disposed in one plane of rotation of the shifting shaft whereas the shifting channels for the first speed and for the reverse speed are disposed in at least one plane of rotation disposed offset to the shifting channels for the second and third speed, characterized by a locking means operable to block a longitudinal displacement of the shifting shaft during a shifting down of the gear in such a manner that reaching of the shifting channel for the first speed or for the reverse speed is effectively prevented thereby, the locking means including a recess in the shifting shaft and a locking pin engaging in said recess, an electromagnet for retracting the locking pin from its locking position and, means including an electric contact provided at the shifting lever for actuating said electromagnet.

5. A transmission according to claim 4, characterized in that said locking pin engages said recess by spring means.

6. A transmission according to claim 4, characterized in that said locking pin engages said recess by gravity.

7. A transmission according to claim 4, characterized in that the shifting channels for the fourth and fifth speeds are disposed in another plane of rotation, and the shifting channels for said first and reverse speeds are disposed in planes of rotation spaced from one another and adjacent to the channels for third and second speed, respectively.

8. A transmission according to claim 7, characterized in that said recess is a longitudinal groove having a length corresponding approximately to the spacing between the planes of rotation containing the shifting channels of fourth and fifth speed and of second and third speed.

9. A transmission according to claim 4, characterized in that the shifting shaft is provided with a shifting finger and in that said locking means normally prevents the shifting finger from reaching the shifting channel for the first speed or the shifting channel for the reverse speed during a shifting down operation.

10. A transmission according to claim 1, characterized in that said locking means includes means operable to prevent reaching of the shifting channels for the first and reverse speed at all times when said shifting shaft is in a position to engage any speeds other than the first and reverse speeds.

* * * * *